United States Patent
Cherian et al.

(10) Patent No.: US 7,406,039 B2
(45) Date of Patent: Jul. 29, 2008

(54) SYSTEM AND METHOD FOR A FAILOVER PROTOCOL IN STORAGE AREA NETWORK CONTROLLERS

(75) Inventors: Jacob Cherian, Austin, TX (US); Thomas J. Kocis, Austin, TX (US)

(73) Assignee: Dell Products L.P., Round Rock, TX (US)

(*) Notice: Subject to any disclaimer, the term of this patent is extended or adjusted under 35 U.S.C. 154(b) by 897 days.

(21) Appl. No.: 10/083,136

(22) Filed: Feb. 26, 2002

(65) Prior Publication Data

US 2003/0172331 A1 Sep. 11, 2003

(51) Int. Cl.
- *G06F 11/00* (2006.01)
- *G06F 15/173* (2006.01)
- *G06F 3/00* (2006.01)

(52) U.S. Cl. .......... 370/228; 370/395.71; 370/401; 709/238; 710/1

(58) Field of Classification Search .......... 370/328, 370/216, 217, 218, 221, 254, 229, 231, 235, 370/237, 242, 363, 374, 378, 225, 228, 360, 370/392, 395.1, 401, 368, 395.71; 455/422.1, 455/460, 524–525; 714/712, 4, 6, 10, 43, 714/44, 7, 48, 5, 14; 710/15, 1, 2, 8, 29, 710/36–38, 51, 62–64, 72–74, 305–317, 710/104, 300, 301–304; 709/239, 105, 213, 709/325, 1, 104, 249, 208, 209, 2, 238; 711/6, 711/203, 114, 100, 113, 120, 161, 162, 5
See application file for complete search history.

(56) References Cited

U.S. PATENT DOCUMENTS

| | | | |
|---|---|---|---|
| 5,975,738 A | 11/1999 | DeKoning et al. | 364/184 |
| 6,061,750 A | 5/2000 | Beardsley et al. | 710/74 |
| 6,081,812 A | 6/2000 | Boggs et al. | 707/202 |
| 6,108,300 A | 8/2000 | Coile et al. | 370/217 |
| 6,160,812 A | 12/2000 | Bauman et al. | 370/416 |
| 6,169,742 B1 | 1/2001 | Chow et al. | 370/402 |
| 6,360,331 B2 | 3/2002 | Vert et al. | 714/4 |
| 6,625,747 B1* | 9/2003 | Tawil et al. | 714/6 |
| 6,779,064 B2* | 8/2004 | McGowen et al. | 710/104 |
| 6,877,044 B2* | 4/2005 | Lo et al. | 710/2 |
| 6,925,528 B2* | 8/2005 | Selkirk et al. | 711/114 |
| 6,954,881 B1* | 10/2005 | Flynn Jr. et al. | 714/43 |
| 2003/0140191 A1* | 7/2003 | McGowen et al. | 710/302 |

\* cited by examiner

*Primary Examiner*—Afsar M. Qureshi
(74) *Attorney, Agent, or Firm*—Baker Botts L.L.P.

(57) ABSTRACT

A system and method for managing the multipath failover protocol of a storage area network that includes storage systems that include multiple ports and multiple storage controllers. A number of available storage paths between each server and each storage unit of the storage system are identified. A storage path is selected. In the event that the storage path becomes inoperable, an alternate storage path is selected in replacement of the inoperable storage path. The alternate storage path will be selected so that it does not include a storage controller that was part of the inoperable storage path.

9 Claims, 2 Drawing Sheets

SYSTEM AND METHOD FOR A FAILOVER PROTOCOL IN STORAGE AREA NETWORK CONTROLLERS

TECHNICAL FIELD

The present disclosure relates generally to the field of storage area networks and, more particularly, to an enhanced system and method for multipath failover for storage systems with multiport controllers.

BACKGROUND

A storage area network (SAN) may be used to provide centralized data sharing, data backup, and storage management. A storage area network is a high-speed network of shared storage systems. Elements of a SAN include servers, switches and storage systems. A storage system is a device that contains a single disk or multiple disks for storing data for a computer system or computer network. A storage system may also contain single or multiple storage controllers for controlling the disks in the system. Each storage controller is itself a hardware device and may have multiple ports. The storage units of a storage system are accessed through the ports and storage controllers of the storage system. Storage units are often called LUNs and are typically the storage entity mounted and accessed by servers of the SAN. "LUN" is a SCSI acronym for logical unit number. The logical unit number addresses one of many storage units that may be present in a SCSI target. This disclosure will use the term storage unit instead of LUN. A collection of storage units is sometimes referred to as a storage pool.

SANs are typically deployed in operating environments that require high availability, necessitating in the design of the networks redundancy and other mechanisms to provide continuous availability in the event of component failure. The storage systems in a SAN can be collocated, which allows for easier maintenance and easier expandability of the storage pool. In a typical network architecture of a SAN, all of the storage units in the storage pool are potentially available to all the servers of the SAN. Additional storage units can be easily added to the storage pool by adding additional disks to the present set of storage systems or by adding additional storage systems together with additional disks. These new storage units will also be accessible from any server of the SAN. A server of a SAN can act as a pathway or transfer agent between the end user and the stored data on the storage units. Each server of a SAN is usually connected to the SAN by two or more host bus adapters (HBAs). Each server also typically includes a communications or multipath driver, which governs the communication between the server and the storage units of the SAN. Network servers may be coupled to the SAN according to the Fibre Channel protocol.

A storage system on a SAN is typically identified by its Node Worldwide Name (WWN). A storage controller on a SAN is typically identified by one or more Port WWNs present on a storage systems with a specific Node WWN. A storage unit on a SAN is typically identified by a unique SCSI logical unit number (LUN) within the storage systems Node WWN. Each storage unit of the SAN can be assigned to one or more predetermined servers of the SAN according the LUN address of the storage unit.

A single storage system in a SAN may be configured to include multiple storage units, which are managed by multiple storage controllers. Storage units on a storage system are accessed through a storage path. The storage path through each storage system is directed by the multipath driver that is installed on each server of the SAN. As an example of a storage path, a multipath driver may identify that a particular storage unit in the SAN is to be accessed through a predetermined port and predetermined storage controller in the storage system. Because a storage unit may be accessed through multiple storage paths, a multipathing driver is required in the server to select from the available storage paths.

The storage paths between a server of the SAN and a storage unit may include a default path and a number of alternate paths. In the event that the storage controller or the port of the storage controller of the default path is rendered inoperable, the multipath driver identifies alternate paths for accessing the storage unit. The selection of an alternate path occurs automatically and is conducted according to the failover protocol of the multipath driver. Often, however, the failover protocol of the multipath driver selects a secondary or alternate path that is also inoperable. For example, a failure of the storage controller will cause all alternate paths through the storage controller to become inoperable. Because multiple ports may be coupled to the failed storage controller multiple alternate paths will be affected by the failure of the single storage controller. Known failover protocols involve a selection of a storage path without regard to the logical relationship between the ports and the controllers of the SAN.

SUMMARY

In accordance with the present disclosure, a method and system is provided for managing the failover protocol in a storage area network. The failover protocol of the present disclosure accounts for the relationship between the ports and storage controller of storage systems that include multiple ports and multiple controllers. The failover protocol of the present invention includes an analysis of the available storage paths from a particular server on which the mulitpath driver resides and the set of storage units on the SAN that are configured to be accessible by the server. This information may be included in an inquiry page or in a database that is presented by the storage system and is accessible by the multipath driver on each server in the SAN. The multipath driver accesses the inquiry page or database to determine the association between ports and storage controllers of each storage system. When a selected storage path fails or becomes inoperable, the multipath driver of the affected server selects an alternate storage path that does not include the storage controller of the failed storage path.

A technical advantage of the present disclosure is a failover protocol that improves the performance of the SAN during failover conditions. Instead of selecting alternate storage paths that include the storage controller of the failed storage path, the failover protocol described herein selects a path on a storage controller that is not the controller attached to the failed path. In this manner, the failover protocol does not result in the expenditure of additional time by selecting an alternate storage path that has a high probability of including a failed storage controller. Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

The present disclosure concerns a method and system for a storage area network (SAN) multipath failover protocol. The protocol described herein involves a determination and analysis of the logical association between ports, storage controllers, and storage units (often referred to as LUNs) of each storage system of the SAN. If a storage path of the SAN is determined to be inoperable, an alternate storage path is selected according to the disclosed failover protocol. Because the disclosed failover protocol involves a determination and analysis of the association of ports and storage controllers of each storage system, the disclosed storage protocol provides for the selection of an alternate storage path that has a greater likelihood of being operable in the event of a failure of a storage path.

Figure 1:
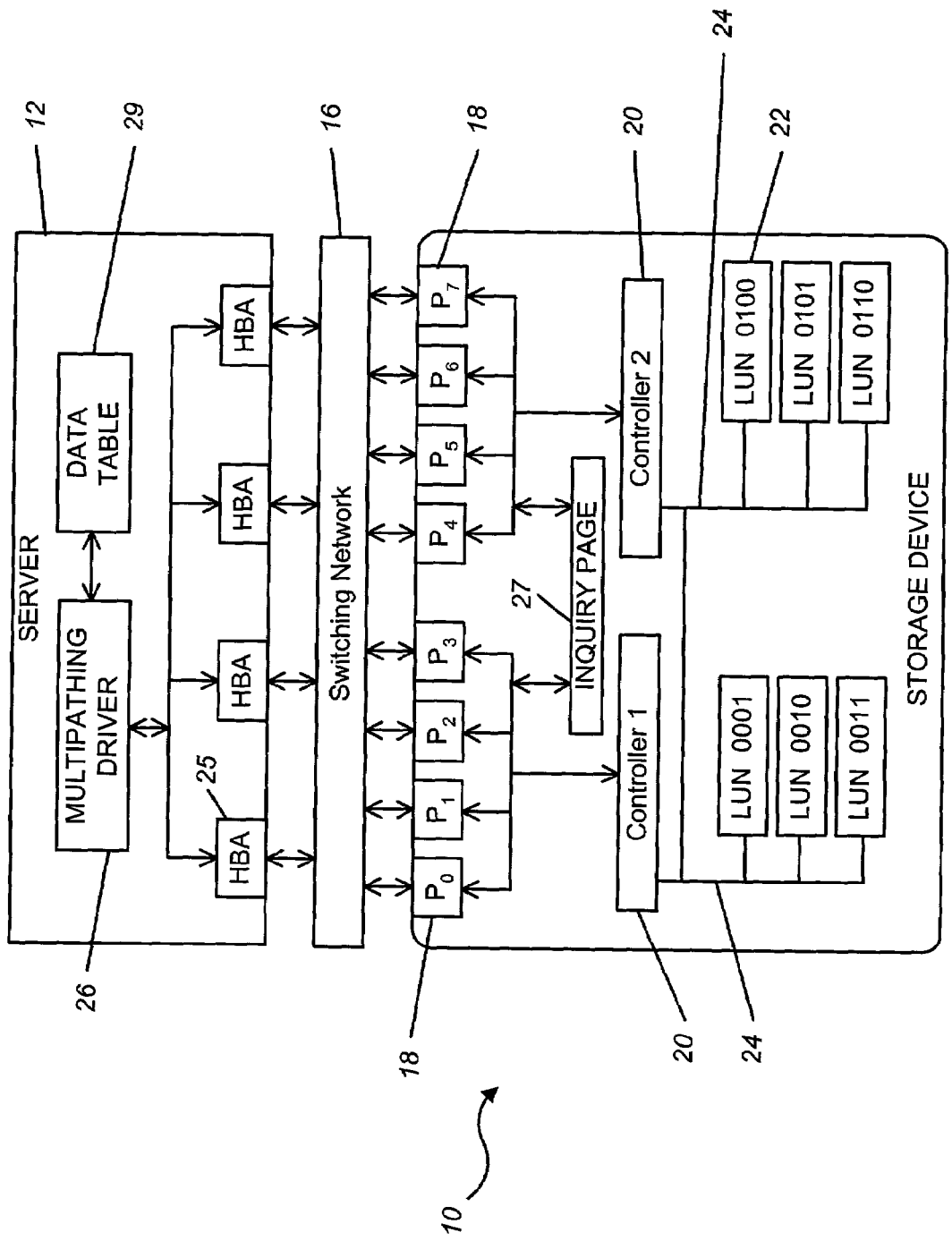
FIG. 1 is a block diagram of an embodiment of a storage area network.

Shown in FIG. 1 is a diagram of a storage area network, which is indicated generally at 10. SAN 10 includes a server 12 and a storage system 14. Although a SAN may include multiple servers and multiple storage systems, the example of FIG. 1 includes a single server coupled to a single storage system. Server 12 and storage system 14 are coupled to one another across a switching network 16. Switching network 16 is coupled to server 12 through the host bus adapters 25 (HBAs) of server 12. Storage system 14 includes a number of ports 18, which are further identified as ports $P_0$-$P_7$. Each of ports 18 is coupled to one of two controllers 20, which are further Server 12 includes a multipath driver 26. Multipath driver identifies the default path and the alternate paths between server 12 and each of the storage units 22. Multipath driver 26 accesses an inquiry page 27. Each storage system maintains an inquiry page 27, which is a unique data page of information concerning the configuration of the storage system. By accessing the data of inquiry page 27, the multipath driver can determine alternate paths between the server or initiator 12 and the storage units 22. The inquiry page includes data that identifies the unique descriptor or identifier for each storage unit in the SAN. The inquiry page also includes data that identifies the storage system that presents or includes the storage unit in the SAN. The inquiry page also identifies the port number through which the storage unit is currently being accessed by the server or initiator. The inquiry page also identifies the physical controller on which the port through which the storage unit is accessed resides. Multipath driver 26 issues inquiries to inquiry page 27 to access the data of the inquiry page. Multipath driver 26 may construct a data table 29 of data retrieved from inquiry page 27.

As an example of the association of storage units, controllers, and ports in a storage system, the default path between server 12 and LUN 0010 of FIG. 1 might be port P1 through Controller 1 to storage unit LUN 0011. The association of the storage unit 0010 to port P1, and the association of Controller 1 to port P1 is recorded in the inquiry page. As a second example, the default path between server 12 and LUN 0110 might be port P7 through Controller 2 to LUN 0110. Similarly, the association of LUN 0110 to port P7, and the association of Controller 2 to port P7 would be recorded in the inquiry page. As part of the protocol for identifying alternate paths for accessing each storage unit, multipath driver 26 accesses inquiry page 27 to build a record of the available paths for accessing each storage unit 22. As an example, the record of available paths for accessing LUN 0010 is:

P0: Controller 1: LUN 0010
P1: Controller 1: LUN 0010
P2: Controller 1: LUN 0010
P3: Controller 1: LUN 0010
P4: Controller 2: LUN 0010
P5: Controller 2: LUN 0010
P6: Controller 2: LUN 0010
P7: Controller 2: LUN 0010

In the example of FIG. 1, multipath driver 26 is able to identify that ports $P_0$-$P_3$ are associated with Controller 1 and ports $P_4$-$P_7$ are associated with Controller 2.

The correlation of ports and controller permits the multipath driver to identify a suitable failover path in the even that the default of selected storage path is inoperable or times out. The correlation of ports and controllers in the inquiry page permits the multipath driver to access the inquiry page to assign a failover path that includes a controller that is different than the controller of the currently selected storage path. As an example, assume that server 12 is accessing LUN 0010 through port $P_0$ and Controller 1. If this path becomes inoperable or times out, the multipath driver can assign a failover path that includes a port that is not associated with the controller of the inoperable path. In this example, a storage path encountered by the multipath driver that is not associated with Controller 1 is through port $P_4$ and Controller 2.

The selection of an alternate storage path through Controller 2 averts the possibility that the selection of a second storage path that accesses the selected storage unit through Controller 1 will also be inoperable. If the failure of Controller 1 is the cause of the inoperable default storage path, all other storage paths through Controller 1 will be disabled. Selecting a storage path through Controller 2 provides a greater likelihood of locating a functioning storage path in a much shorter time frame.

Figure 2:
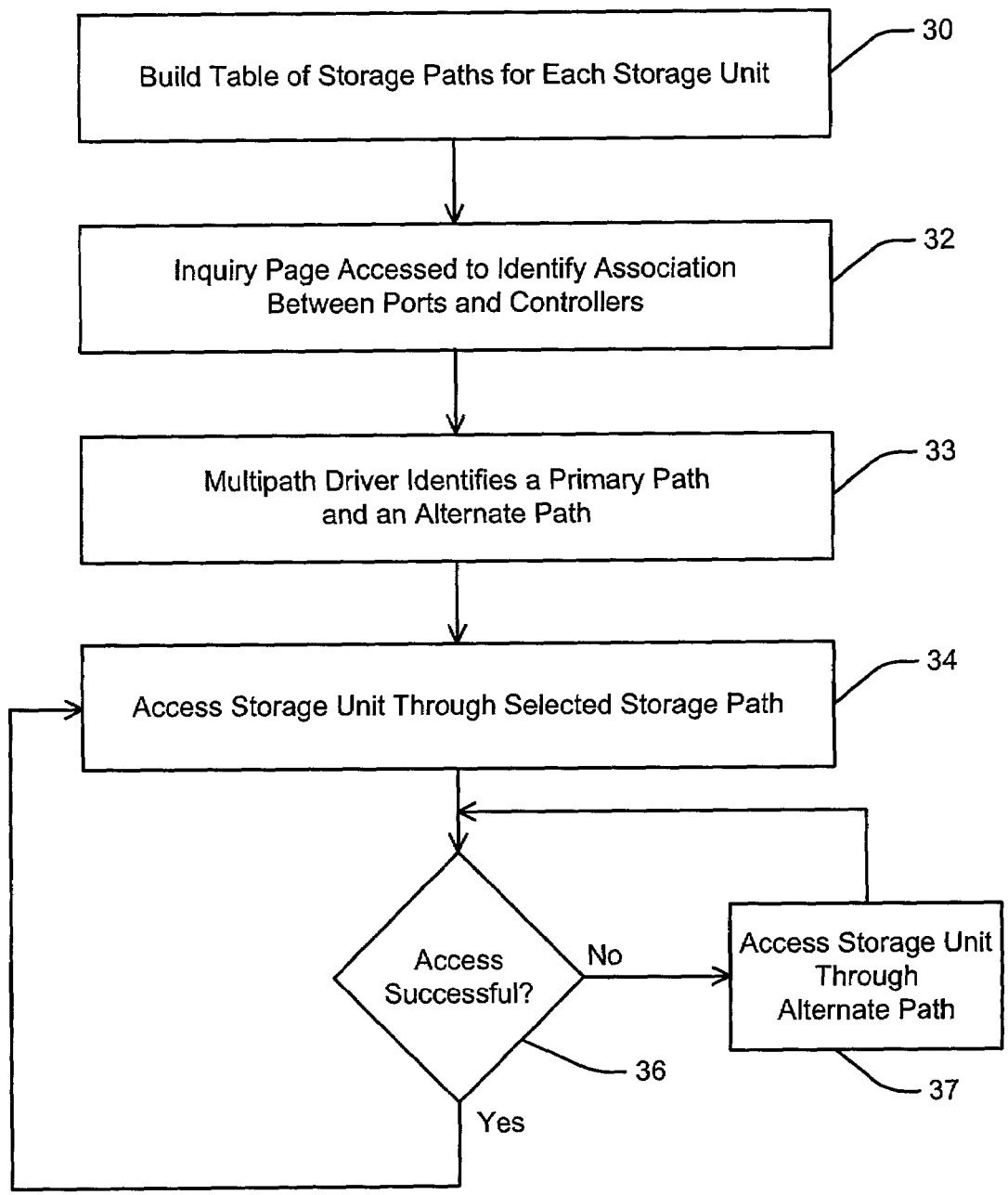
FIG. 2 is a flow diagram of a method for selecting a storage path through a storage area network.

Shown in FIG. 2 is a flow diagram of the method followed by the multipath driver to determine the association of ports and controllers and select an alternate storage path in the event of a failure in the default or selected storage path. At step 30, upon initialization of the SAN, each multipath driver of the SAN identifies the available storage paths for accessing each storage unit in the SAN. Each storage path includes an identification of the port, storage controller and storage unit of the path. Following the determination of the available storage paths for each storage unit, the multipath drivers at step 32 access the inquiry page to determine the associations between storage ports and storage controllers. At step 33, the multipath drivers identify a primary path and at least one alternate path. The alternate path will differ from the primary path in that the alternate path will include a controller that is different than the controller of the primary path.

At step 34, the server attempts to access a storage unit through the selected storage path, which in this instance is the primary storage path. If the primary storage path has been determined to inoperable at step 36, the multipath driver at step 37 selects an alternate path for data accesses between the server and the selected storage unit. The selection of the alternate path involves a selection of a storage path that includes a storage controller that is different from the storage controller of the existing storage path. As such, regardless of the number of ports on the storage controller of the existing storage path, and regardless of the number of alternate storage paths through the storage controller of the existing storage path, an alternate storage path is selected that does not include the storage controller of the existing storage path. Once an alternate storage path is selected, processing continues at step 34 with an attempt by the server to access the storage unit through the alternate storage path. As an alternative, the alternate path that involves a separate controller may be a second alternate path, with the first alternate path being a path that includes the same controller as the primary storage path.

Although the present disclosure has been described in detail, it should be understood that various changes, substitutions, and alterations can be made hereto without departing from the spirit and the scope of the invention as defined by the appended claims.

What is claimed is:

1. A method for selecting an alternate storage path between a server and a storage unit in a storage area network following the failure of an existing storage path, comprising the steps of:
    building a table of available storage paths between the server and the storage unit;
    identifying a storage controller of the existing storage path, wherein the step of identifying a storage controller of the existing storage path comprises the step of identifying a logical association between ports and storage controllers of the storage area network, and wherein the table includes information regarding the logical association between ports and storage controllers of the storage area network; and
    selecting an alternate storage path that does not include the storage controller of the existing storage path.

2. The method of selecting an alternate storage path of claim 1, wherein the step of identifying the storage controller of the existing storage path comprises the step of identifying available storage paths between the server and the storage unit.

3. The method for selecting an alternate storage path of claim 1, wherein the existing storage path is a default storage path between the server and the storage unit.

4. A storage area network, comprising:
    a server having a driver;
    a storage system, wherein the storage system comprises,
        multiple ports;
        multiple storage controllers, wherein each of the ports is associated with one of the storage controllers;
        a storage unit;
        a table accessible by the driver that includes an identification of available storage paths between the server and the storage unit of the storage system; and
    a data source accessible by the driver that includes an identification of the association of controllers and storage units of the storage system, wherein the driver is able to select a storage path between the server and the storage unit and is able to select an alternate storage path in the event that a first selected storage path becomes inoperable, wherein an alternate path does not include the storage controller of the first selected storage path.

5. The storage area network of claim 4, further comprising multiple storage units accessible by the multiple storage controllers of the storage system.

6. The storage area network of claim 4, further comprising a data source accessible by the driver that includes an identification of the ports through which each storage unit of the storage system is accessible.

7. The method for providing a default and an alternate storage path between a server and a storage system having multiple ports, multiple storage controllers, and one or more storage units, comprising the steps of:
    identifying available storage paths between each server the one or more storage units of the storage system, wherein the step of identifying comprises the step of building a table of the available storage paths between the server and each storage unit of the storage system, wherein the step of identifying available storage paths comprises the step of identifying a relationship between the storage controllers and the ports of the storage system, and wherein the table includes information regarding the relationship between the ports and the storage controllers of the storage system;
    selecting a defined default storage path between the server and a storage unit of the storage system; and
    if the defined default storage path becomes inoperable, selecting an alternate storage path between the server and the storage unit of the storage system, the alternate storage path including a storage controller that is different than the storage controller of the first storage path.

8. The method for providing a default and an alternate storage path of claim 7, wherein the step of identifying the relationship between the storage controllers and the ports of the storage system comprises the step of identifying for each storage controller the ports that communicate to the storage controller.

9. A method for switching from a default storage path to an alternate storage path between a server and a storage system having multiple ports, multiple storage controllers, and one or more storage units, comprising the steps of: building a table of available storage paths between the server and the storage unit of the storage system;
    recognizing a failure condition in the default storage path; and
    selecting an alternate storage path between the server and the storage unit of the storage system, wherein the alternate storage path including a storage controller that is different than the storage controller of the first storage path, and wherein the step of selecting an alternate storage path comprises the step of accessing an information source to determine the associations between storage units and storage controllers of the storage system.

* * * * *